UNITED STATES PATENT OFFICE.

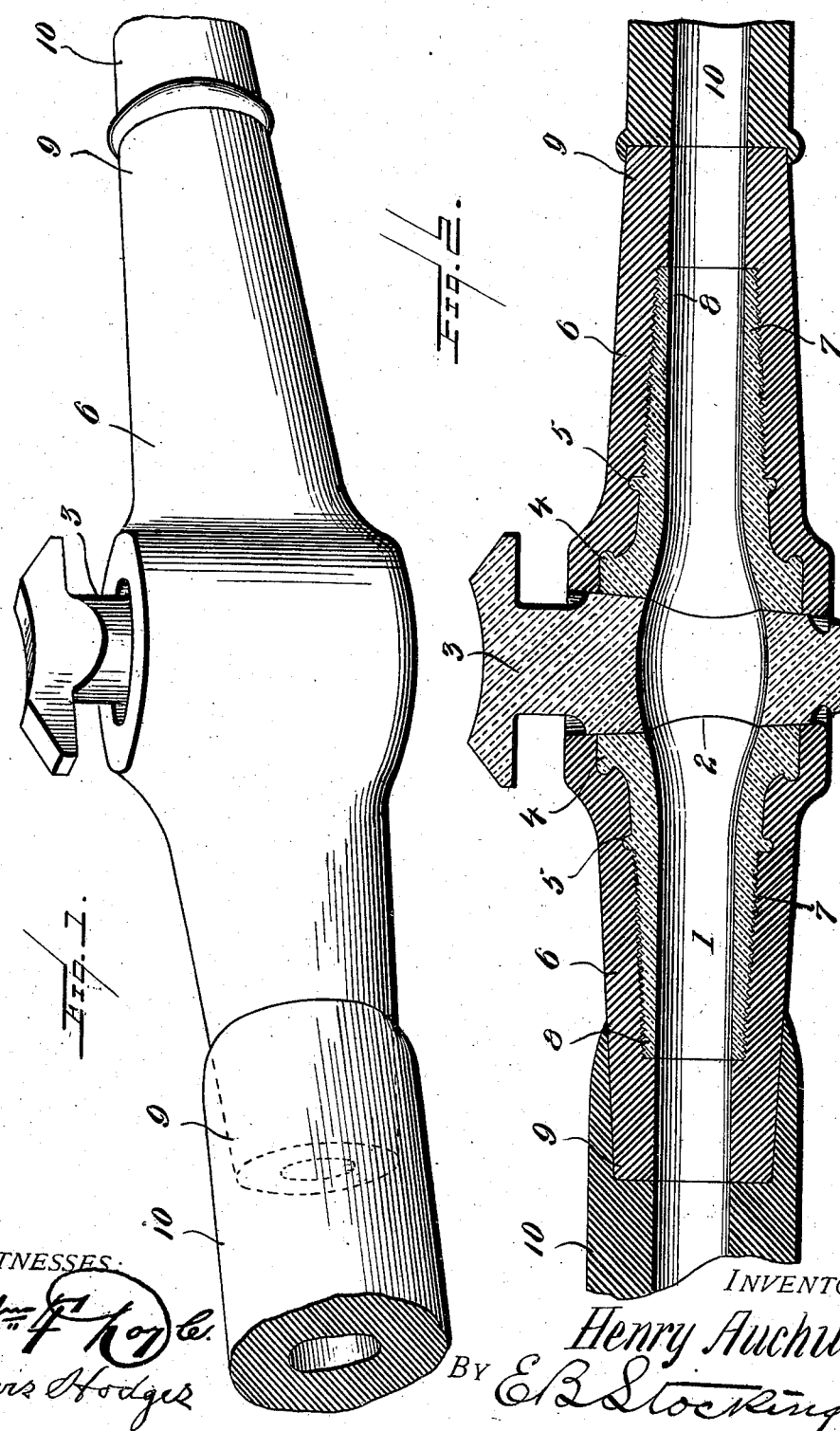

HENRY AUCHU, OF EMPORIUM, PENNSYLVANIA.

METAL-COATED SPIGOT.

No. 867,780.  Specification of Letters Patent.  Patented Oct. 8, 1907.

Application filed February 21, 1907. Serial No. 358,556.

*To all whom it may concern:*

Be it known that I, HENRY AUCHU, a citizen of the United States, residing at Emporium, in the county of Cameron, State of Pennsylvania, have invented certain new and useful Improvements in Metal-Coated Spigots, of which the following is a specification, reference being had therein to the accompanying drawing.

This invention relates to a metal coated spigot and particularly to a spigot formed of glass or vitrified material such as used in the chemical arts to resist any action of the material conducted therethrough.

The invention has for an object to provide a spigot of vitrified material with a metal coating secured thereto and extended beyond its opposite ends to provide means for the connection of a proper conducting pipe to the spigot, and to protect the latter while the seat for the cock is being ground and also against breakage while connecting the conducting pipe thereto or against the loss of acid or other material by a breakage of the spigot while in use.

Other and further objects and advantages of the invention will be hereinafter set forth and the novel features thereof defined by the appended claims.

In the drawing:—Figure 1 is a perspective showing the spigot applied to the conducting pipe, and Fig. 2 is an enlarged longitudinal section through the spigot.

Like numerals refer to like parts in the several views of the drawing.

The numeral 1 designates the body of the spigot which may be of glass, pottery or any other desired vitrified material adapted to resist the action of acid or other substances conducted therethrough. This body is provided at its center with the ground seat 2 adapted to receive the rotatable stop cock 3 which is properly mounted therein. The extended ends at the opposite sides of this seat are provided with a shoulder 4 and a rib 5 both extending circumferentially thereof and upon which the metal coating 6 of lead or other proper material is cast or molded so as to secure it to the body of the spigot. The ends of this body are also threaded or grooved as at 7 so as to secure additional surface contact with the lead, and at the end of the spigot a shoulder 8 is formed in the coating or covering to prevent any longitudinal slipping of the parts. The ends 9 of this coating are extended beyond the vitrified body of the spigot for the attachment thereto of the conducting pipes 10 which are of lead or other acid resisting material and attached to the spigot coating by sweating, burning, soldering or otherwise.

In the ordinary construction of a spigot made of glass or vitrified material, the same is very liable to breakage while the seat for the cock therein is being ground or finished, and also during the attaching of the conducting pipe as the molding or casting of such a pipe thereon expands the material of the spigot and frequently throws the ground seat out of proper alinement by the expansion of the material. Such a spigot if not coated will not stand the action of the heat while liquids of high temperature are passed therethrough and often crack when liquids such as acids or other dangerous chemicals are being conducted through the pipes which is liable to cause much damage and injury to both the apparatus and workmen coming in contact therewith. It has therefore been found that by providing a metal coating upon the body of the spigot the same is effectually protected from the heat and also properly supported for the grinding of the valve seat so that when the plug or cock is inserted the seat does not lose its originally true outline and accurate fit to the ground seat. Furthermore, the extended ends of this casing or coating provide means for the attachment of the conducting pipes by burning or sweating thereon at a point beyond the end of the vitrified spigot so as to remove the heat from the body thereof. In the use of the invention it will be observed that this coating protects the spigot from the contact of the outer atmosphere which is at a much lower temperature than the liquid conducted therethrough and this prevents the cracking or breakage due to such differences in temperature, and if for any reason such breakage does occur the liquid is retained by the metal covering and prevented from loss or escapage from the spigot. This metal coating is placed upon the spigot body before it is ground or finished so that any breakage which might occur at such time does not occasion the loss of time and labor embodied in grinding and finishing the completed product, and may also be applied after it is ground and finished, and when once applied to the vitrified material is effectively retained thereon so as to protect the body of the spigot against the action of acid or accidental breakage from contact therewith.

Having described my invention and set forth its merits what I claim and desire to secure by Letters Patent is:—

1. A spigot formed of vitrified material and provided with a metallic coating surrounding the outer surface thereof and extended longitudinally beyond the ends of the spigot to form a metallic prolongation thereof shaped to form a portion of a soft metal joint for an attaching portion.

2. A spigot formed of vitrified material and provided with a metallic jacket inclosing the same and having an attaching portion extending beyond the ends of the spigot body and shaped to form a portion of a soft metal joint and provided with a shoulder to engage said ends.

In testimony whereof, I affix my signature in presence of two witnesses.

HENRY AUCHU.

Witnesses:
 GEO. P. JONES,
 H. A. COX.